US012073798B2

(12) United States Patent
Liu

(10) Patent No.: US 12,073,798 B2
(45) Date of Patent: Aug. 27, 2024

(54) DISPLAY DEVICE AND DISPLAY METHOD THEREOF

(71) Applicant: TCL CHINA STAR OPTOELECTRONICS TECHNOLOGY CO., LTD., Guangdong (CN)

(72) Inventor: Lu Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,595

(22) PCT Filed: Dec. 23, 2021

(86) PCT No.: PCT/CN2021/140912
§ 371 (c)(1),
(2) Date: Dec. 28, 2021

(87) PCT Pub. No.: WO2023/115467
PCT Pub. Date: Jun. 29, 2023

(65) Prior Publication Data
US 2024/0038180 A1 Feb. 1, 2024

(30) Foreign Application Priority Data
Dec. 22, 2021 (CN) ......................... 202111576430.4

(51) Int. Cl.
*G09G 3/34* (2006.01)

(52) U.S. Cl.
CPC ... *G09G 3/3406* (2013.01); *G09G 2320/0247* (2013.01); *G09G 2320/0626* (2013.01)

(58) Field of Classification Search
CPC ... G09G 2320/0626; G09G 2340/0435; G09G 2360/16
See application file for complete search history.

(56) References Cited

U.S. PATENT DOCUMENTS 9,299,312 B2 * 3/2016 Wyatt .................... G09G 5/006
2015/0109346 A1 * 4/2015 Taniguchi ............ G09G 3/3406 345/102

(Continued)

FOREIGN PATENT DOCUMENTS

CN 106205460 A 12/2016
CN 108806620 A 11/2018

(Continued)

OTHER PUBLICATIONS

CN111640390A Display image flicker adjusting circuit and method and display device Sep. 8, 2020 Wang Guangxing (Year: 2020).*

(Continued)

*Primary Examiner* — Van N Chow
(74) *Attorney, Agent, or Firm* — PV IP PC; Wei Te Chung; Zhigang Ma

(57) ABSTRACT

A display device and a display method thereof are disclosed. The display method includes following steps: First, obtaining a target display frequency and a target backlight brightness value of a target display device. Then, obtaining a first display frequency and a first backlight brightness value of the target display device within a predetermined period. After that, confirming a backlight brightness compensation value of the target display device within the predetermined period according to a differential between the target display frequency and the first display frequency when the first display frequency and the target display frequency are (Continued)

different. Finally, compensating for the first backlight brightness value according to the backlight brightness compensation value.

17 Claims, 2 Drawing Sheets

(56) References Cited

U.S. PATENT DOCUMENTS

| | | | | |
|---|---|---|---|---|
| 2022/0114956 A1* | 4/2022 | Lee | ...................... | G09G 3/3225 |
| 2023/0075226 A1* | 3/2023 | Lee | ...................... | G09G 3/2096 |

FOREIGN PATENT DOCUMENTS

| | | | |
|---|---|---|---|
| CN | 110570828 | A | 12/2019 |
| CN | 111640390 | A | 9/2020 |
| CN | 111653238 | A | 9/2020 |
| CN | 112530351 | A | 3/2021 |
| CN | 112652263 | A | 4/2021 |
| CN | 112767867 | A | 5/2021 |
| CN | 113470581 | A | 10/2021 |
| CN | 113658565 | A | 11/2021 |
| CN | 113823233 | A | 12/2021 |
| JP | 2016170864 | A | 9/2016 |
| JP | 2019032403 | A | 2/2019 |
| WO | 2012147662 | A1 | 11/2012 |

OTHER PUBLICATIONS

International Search Report in International application No. PCT/CN2021/140912, mailed on Jul. 27, 2022.

Written Opinion of the International Search Authority in International application No. PCT/CN2021/140912, mailed on Jul. 27, 2022.

Chinese Office Action issued in corresponding Chinese Patent Application No. 202111576430.4 dated Oct. 8, 2022, pp. 1-9.

* cited by examiner

DISPLAY DEVICE AND DISPLAY METHOD THEREOF

FIELD

The present disclosure relates to a field of display technologies, and more particularly, to a display device and a display method thereof.

BACKGROUND

As electronic sports (Esports) have been all the rage in market these years, many hardware manufacturers see business opportunities, resulting in more and more diverse display devices. Freesync, which realizes a variable refresh rate, has gradually become one of a critical functional technology in recent Esports display fields. Freesync was first proposed by AMD and can solve issues of screen tearing and image vibration, thereby improving smoothness of images to achieve good a gaming experience. Official also knows Freesync as a dynamic refresh rate (DDR) technology that changes a duration of a vertical blanking (VBlank) phase within a frame period of display panels to dynamically adjust a refresh rate of the display panels. Therefore, the refresh rate of the display panels can match a refresh rate of graphics cards. As such, issues of screen tearing and image vibration can be solved, and smoothness of images can be improved.

However, different durations of VBlank phases lead to different amounts of leakage currents, different amounts of leakage currents further lead to different brightness of images displayed by display panels. Therefore, when a refresh rate of display devices is changed, the display devices will flicker.

Therefore, it is necessary to develop a display device and a display method thereof to solve the above technical issues.

Regarding the Technical Issue:

Conventional display devices will flicker when a refresh rate is changed.

SUMMARY

An embodiment of the present disclosure provides a display method of a display device, comprising following steps:

obtaining a target display frequency and a target backlight brightness value of a target display device;

obtaining a first display frequency and a first backlight brightness value of the target display device within a predetermined period;

confirming a backlight brightness compensation value of the target display device within the predetermined period according to a differential between the target display frequency and the first display frequency when the first display frequency and the target display frequency are different; and compensating for the first backlight brightness value according to the backlight brightness compensation value;

wherein before the step of obtaining the target display frequency and the target backlight brightness value of the target display device, the method comprises following steps:

inputting an enabling signal into a timing controller of the target display device, wherein the enabling signal comprises a vertical blanking period; and obtaining a refresh mode of the target display device;

wherein when the refresh mode of the target display device has a constant display frequency, the vertical blanking period is a constant vertical blanking period; and when the refresh mode of the target display device has a variable display frequency, the vertical blanking period is a variable vertical blanking period.

In the display method of the display device provided by an embodiment of the present disclosure, the step of obtaining the target display frequency and the target backlight brightness value of the target display device comprises following steps:

obtaining a proportion of usage time of different display frequencies of the target display device within a historical period;

- obtaining a second display frequency of the target display device, wherein a proportion of usage time of the second display frequency is greater than or equal to a first threshold value; and
- setting the second display frequency to be the target display frequency of the target display device, and setting a backlight brightness value corresponding to the second display frequency to be the target backlight brightness value of the target display device.

In the display method of the display device provided by an embodiment of the present disclosure, the step of obtaining the target display frequency and the target backlight brightness value of the target display device comprises following steps:

obtaining a proportion of usage time of different display frequencies of the target display device within a historical period;

- obtaining a third display frequency of the target display device, wherein a proportion of usage time of the third display frequency is less than a first threshold value;
- obtaining a fourth display frequency of the target display device, wherein a proportion of usage time of the fourth display frequency is greater than or equal to the threshold value; and
- setting the fourth display frequency to be the target display frequency of the target display device, setting a backlight brightness value corresponding to the fourth display frequency to be the target backlight brightness value of the target display device.

In the display method of the display device provided by an embodiment of the present disclosure, the step of confirming the backlight brightness compensation value of the target display device within the predetermined period according to the differential between the target display frequency and the first display frequency when the first display frequency and the target display frequency are different comprises following steps:

- obtaining the differential between the target display frequency and the first display frequency when the first display frequency and the target display frequency are different;
- obtaining a first refresh duration of a display frame image of a backlight unit of the display device corresponding to a target display frequency phase, and obtaining a second refresh duration of the display frame image of the backlight unit of the display device corresponding to the first display frequency phase;
- obtaining a third refresh duration of the backlight unit when the differential is greater than 0, wherein the third refresh duration is equal to a differential between the second refresh duration and the first refresh duration; and confirming the backlight brightness compensation value of the target display device within the predetermined period during the third refresh duration of the backlight unit.

In the display method of the display device provided by an embodiment of the present disclosure, when the target display frequency is greater than the first display frequency, the step of confirming the backlight brightness compensation value of the target display device within the predetermined period during the third refresh duration corresponding to the backlight unit comprises following steps:

confirming a refresh duration t and refresh times N of the backlight unit of a backlight driver chip of the display device during the third refresh duration, wherein t is greater than 0 and N is a positive integer; and compensating for a brightness of the backlight unit by the backlight driver chip to confirm the backlight brightness compensation value of the target display device within the predetermined period during an nth refresh time in the third refresh duration of the backlight unit, wherein n is less than or equal to N and is a positive integer.

In the display method of the display device provided by an embodiment of the present disclosure, in the step of compensating for a brightness of the backlight unit by the backlight driver chip during the nth refresh time in the third refresh duration of the backlight unit, a plurality of compensation values provided by the backlight driver chip for compensating for a brightness of the backlight unit in every refresh time t are same.

In the display method of the display device provided by an embodiment of the present disclosure, the step of confirming the backlight brightness compensation value of the target display device within the predetermined period according to the differential between the target display frequency and the first display frequency when the first display frequency and the target display frequency are different comprises a following step:

confirming the backlight brightness compensation value of the target display device within the predetermined period during the second refresh duration of the backlight unit when the differential is less than 0.

In the display method of the display device provided by an embodiment of the present disclosure, in the step of compensating for the first backlight brightness value according to the backlight brightness compensation value, after the first backlight brightness value is compensated, the first backlight brightness value is equal to the target backlight brightness value.

Correspondingly, an embodiment of the present disclosure provides a display method of the display device, comprising following steps:

obtaining a target display frequency and a target backlight brightness value of a target display device;

obtaining a first display frequency and a first backlight brightness value of the target display device within a predetermined period;

confirming a backlight brightness compensation value of the target display device within the predetermined period according to a differential between the target display frequency and the first display frequency when the first display frequency and the target display frequency are different; and compensating for the first backlight brightness value according to the backlight brightness compensation value.

In the display method of the display device provided by an embodiment of the present disclosure, the step of obtaining the target display frequency and the target backlight brightness value of the target display device comprises following steps:

obtaining a proportion of usage time of different display frequencies of the target display device within a historical period;

obtaining a second display frequency of the target display device, wherein a proportion of usage time of the second display frequency is greater than or equal to a first threshold value; and setting the second display frequency to be the target display frequency of the target display device, and setting a backlight brightness value corresponding to the second display frequency to be the target backlight brightness value of the target display device.

In the display method of the display device provided by an embodiment of the present disclosure, the step of obtaining the target display frequency and the target backlight brightness value of the target display device comprises following steps:

obtaining a proportion of usage time of different display frequencies of the target display device within a historical period;

obtaining a third display frequency of the target display device, wherein a proportion of usage time of the third display frequency is less than a first threshold value;

obtaining a fourth display frequency of the target display device, wherein a proportion of usage time of the fourth display frequency is greater than or equal to the threshold value; and setting the fourth display frequency to be the target display frequency of the target display device, setting a backlight brightness value corresponding to the fourth display frequency to be the target backlight brightness value of the target display device.

In the display method of the display device provided by an embodiment of the present disclosure, the step of confirming the backlight brightness compensation value of the target display device within the predetermined period according to the differential between the target display frequency and the first display frequency when the first display frequency and the target display frequency are different comprises following steps:

obtaining the differential between the target display frequency and the first display frequency when the first display frequency and the target display frequency are different;

obtaining a first refresh duration of a display frame image of a backlight unit of the display device corresponding to a step of the target display frequency, and obtaining a second refresh duration of the display frame image of the backlight unit of the display device corresponding to a step of the first display frequency;

obtaining a third refresh duration of the backlight unit when the differential is greater than 0, wherein the third refresh duration is equal to a differential between the second refresh duration and the first refresh duration; and confirming the backlight brightness compensation value of the target display device within the predetermined period during the third refresh duration of the backlight unit.

In the display method of the display device provided by an embodiment of the present disclosure, when the target display frequency is greater than the first display frequency, the step of confirming the backlight brightness compensation value of the target display device within the predetermined period during the third refresh duration corresponding to the backlight unit comprises following steps:

confirming a refresh duration t and refresh times N of the backlight unit of a backlight driver chip of the display device during the third refresh duration, wherein t is greater than 0 and N is a positive integer; and compensating for a brightness of the backlight unit by the backlight driver chip to confirm the backlight brightness compensation value of the target display device within the predetermined period during an nth refresh time in the third refresh duration of the backlight unit, wherein n is less than or equal to N and is a positive integer.

In the display method of the display device provided by an embodiment of the present disclosure, in the step of compensating for a brightness of the backlight unit by the backlight driver chip during the nth refresh time in the third refresh duration of the backlight unit, a plurality of compensation values provided by the backlight driver chip for compensating for a brightness of the backlight unit in every refresh time t are same.

In the display method of the display device provided by an embodiment of the present disclosure, the step of confirming the backlight brightness compensation value of the target display device within the predetermined period according to the differential between the target display frequency and the first display frequency when the first display frequency and the target display frequency are different comprises a following step:

confirming the backlight brightness compensation value of the target display device within the predetermined period during the second refresh duration of the backlight unit when the differential is less than 0.

In the display method of the display device provided by an embodiment of the present disclosure, in the step of compensating for the first backlight brightness value according to the backlight brightness compensation value, after the first backlight brightness value is compensated, the first backlight brightness value is equal to the target backlight brightness value.

Correspondingly, an embodiment of the present disclosure provides a display device, comprising: a first obtaining module, a second obtaining module, a processing module, and a compensation module.

wherein the first obtaining module is configured to obtain a target display frequency and a target backlight brightness value of a target display device; the second obtaining module is configured to obtain a first display frequency and a first backlight brightness value of the target display device; the processing module is configured to confirm a backlight brightness compensation value of the target display device within a predetermined period according to a differential between the target display frequency and the first display frequency when the first display frequency and the target display frequency are different; and the compensation module is configured to compensate for the first backlight brightness value according to the backlight brightness compensation value.

In the display device provided by an embodiment of the present disclosure, the first obtaining module is configured to obtain a refresh mode of the target display device; and wherein when the refresh mode of the target display device has a constant display frequency, the vertical blanking period is a constant vertical blanking period; and when the refresh mode of the target display device has a variable display frequency, the vertical blanking period is a variable vertical blanking period.

In the display device provided by an embodiment of the present disclosure, the processing module is configured to obtain a differential between the target display frequency and the first display frequency when the first display frequency and the target display frequency are different, and the processing module is configured to obtain a first refresh duration of a display frame image of a backlight unit of the display device corresponding to a target display frequency phase, and is configured to obtain a second refresh duration of the display frame image of the backlight unit of the display device corresponding to the first display frequency phase; and wherein when the differential is greater than 0, the processing module is configured to obtain a third refresh duration of the backlight unit, and the third refresh duration is a differential between the second refresh duration and the first refresh duration.

In the display device provided by an embodiment of the present disclosure, the compensation module is configured to adjust the compensated first backlight brightness value to the target backlight brightness value.

Regarding the beneficial effects:

Embodiments of the present disclosure provide a display device and a display method thereof. The display method includes following steps: First, obtaining a target display frequency and a target backlight brightness value of a target display device. Then, obtaining a first display frequency and a first backlight brightness value of the target display device within a predetermined period. After that, confirming a backlight brightness compensation value of the target display device within the predetermined period according to a differential between the target display frequency and the first display frequency when the first display frequency and the target display frequency are different. Finally, compensating for the first backlight brightness value according to the backlight brightness compensation value. In the above display method, first, the backlight brightness compensation value of the target display device within the predetermined period is confirmed according to the differential between the target display frequency and the first display frequency. Then, the first backlight brightness value is compensated according to the backlight brightness compensation value. Therefore, changes in brightness of the display device caused by changes in frequency in a variable refresh frequency mode are adjusted by controlling a brightness of a backlight source of the display device. As such, a flickering phenomenon of the display device caused by changes in frequency in the variable refresh frequency mode can be effectively alleviated, and a display effect of the display device can be further improved.

DETAILED DESCRIPTION

Conventional display panels have a technical issue of a brightness at a middle of a screen less than a brightness at a periphery of the screen due to the curved periphery. Embodiments of the present disclosure can solve the above issue.

The present disclosure provides a display method of a display device, the method includes, but is not limited to, following embodiments and a combination thereof.

Figure 1:
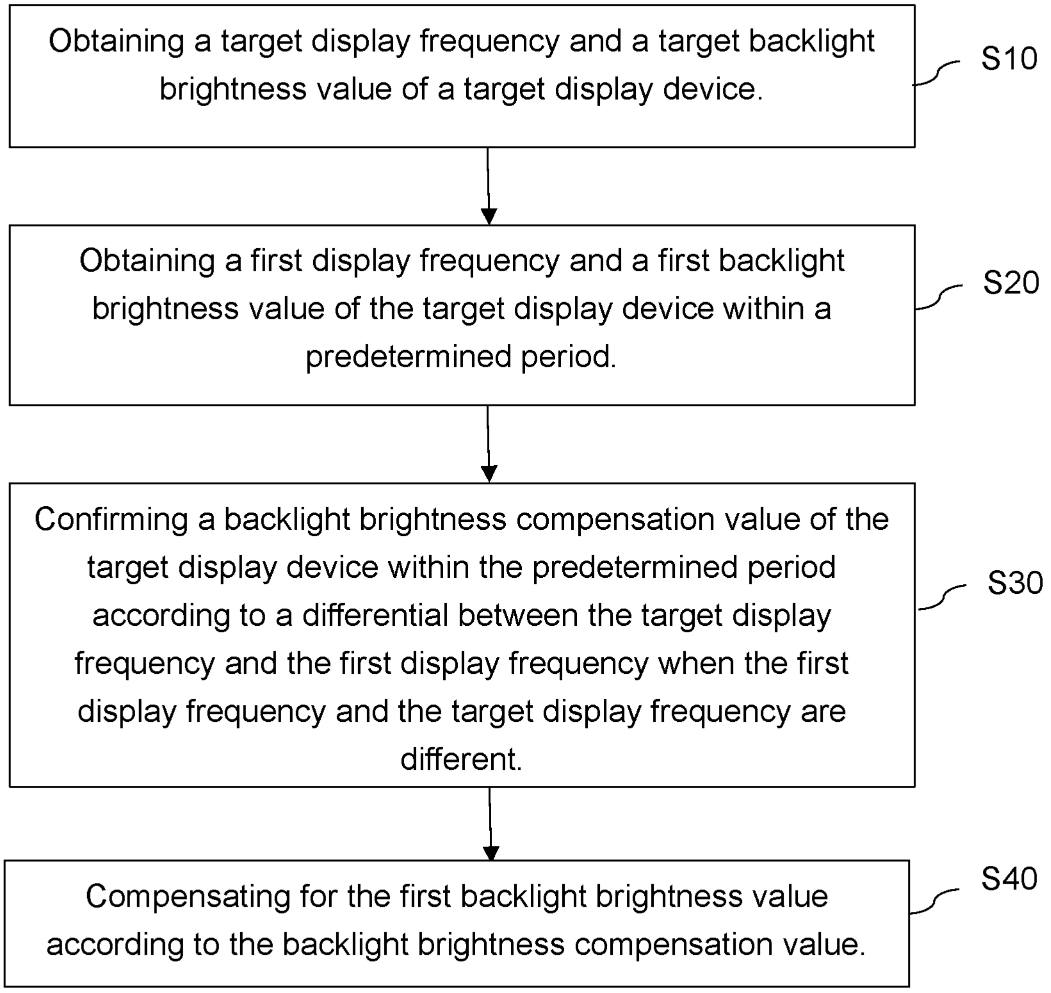
FIG. 1 is a flowchart showing a display method of a display device provided by an embodiment of the present disclosure.

In one embodiment, as shown in FIG. 1, a flowchart showing a brightness adjustment method provided by an embodiment of the present disclosure is provided. The brightness adjustment method includes, but is not limited to, following steps:

S10, obtaining a target display frequency and a target backlight brightness value of a target display device.

Specifically, the step S10 further includes following steps:

The target display device includes a display panel and a backlight module disposed on a side of the display panel. The display panel includes a plurality of pixel units arranged in an array manner. Each of the pixel units includes at least one sub-pixel. The sub-pixel includes a pixel electrode, a common electrode, and a liquid crystal layer disposed between the pixel electrode and the common electrode. In addition, the display panel further includes a plurality of thin-film transistors (TFTs). A gate of each of the TFTs is connected to a gate line. A source of each of the TFTs is connected to a data line. A drain of each of the TFTs is connected to the pixel electrode.

Specifically, to improve a contrast of images displayed by the display device. Light emitted from the backlight module can be partly adjusted. Therefore, backlight can be partitionedly displayed. When images need to be dark, a brightness of backlight can be adjusted to be lower. Alternatively, the backlight module may not even emit light. the backlight module includes a plurality of backlight units and a plurality of backlight driver chips. The backlight driver chips control the backlight units to emit light. Preferably, the backlight units are a plurality of mini light-emitting diodes (LEDs) backlight units which can realize more light-emitting partitions. Therefore, images displayed by the display device can be more delicate, thereby further improving contrast of the images.

Furthermore, commonly driving methods of the mini LED backlight units are (pulse width modulation) PWM mode and (pulse amplitude modulation) PAM mode. A backlight brightness can be adjusted in time by these two driving methods. Furthermore, the mini LED backlight units have a higher response time compared with liquid crystals. Therefore, a refresh rate of mini LED backlight modules can be 40 times higher than a refresh rate of liquid crystal panels (LCDs). In one preferred embodiment, a display frequency of the display panel can range from 48 Hz to 165 Hz. A constant frequency of the backlight module can be any one of 1920 Hz, 2400 Hz, or 3840 Hz.

In the present embodiment, before the step of obtaining the target display frequency and the target backlight brightness value of the target display device, the method further includes following steps:

First, correcting an actual brightness value of every gray-scale image of the target display device in every different display frequency by a gamma voltage correction device. Therefore, the actual brightness value of every gray-scale image can satisfy a brightness value when a gamma value is 2.2. As such, gamma voltage data, a plurality of VBlank periods, and a plurality of refresh rates corresponding to the VBlank periods of the target display device under different display frequencies can be obtained. The gamma voltage data comprise a plurality of gamma voltages respectively corresponding to a first refresh rate and a second refresh rate which are not equal.

Specifically, the gamma voltage data comprise the gamma voltages respectively corresponding to the first refresh rate and the second refresh rate which are not equal. Specifically, the first refresh rate is preferably the highest refresh rate of the display panel, and the second refresh rate is preferably the lowest rate of the display panel. Each gamma voltage corresponding to the refresh rate includes a plurality of sub-gamma voltages corresponding to a plurality of gray-scales of the display panel.

A period from when the display panel starts to display one frame of image to when the display panel starts to display a next frame of image is called a frame period, and the frame period includes a display phase and a VBlank phase. Durations of multiple vertical blanking phases (VBlank durations) and the refresh rate corresponding to each vertical blanking duration are stored in the gamma voltage correction device in advance. It should be noted that a number of pre-stored VBlank durations can be determined according to actual conditions. The greater the number of pre-stored vertical blanking durations stored, the greater the pre-stored refresh rates stored.

For example, a variable refresh rate interval of the display panel ranges from 48 Hz to 165 Hz, a grayscale interval ranges from 0 to 255, a first refresh rate is 165 Hz, and a second refresh rate is 48 Hz. A gamma voltage corresponding to the first refresh rate of 165 Hz includes a sub-gamma voltage a0 corresponding to gray level 0, a sub-gamma voltage al corresponding to gray level 1, . . . , and the sub-gamma voltage a255 corresponding to gray level 255. A gamma voltage corresponding to the second refresh rate of 48 Hz includes a sub-gamma voltage b0 corresponding to gray level 0, a sub-gamma voltage b1 corresponding to gray level 1, . . . , and a sub-gamma voltage b255 corresponding to gray level 255. It is assumed that the pre-stored VBlank durations are 1, 2, 4, 7, 9, 12, 20, 30, and 45, respectively, and the refresh rates corresponding to the pre-stored VBlank durations are 165 Hz, 110 Hz, 100 Hz, 80 Hz, 70 Hz, 60 Hz, and 48 Hz.

In addition, an enabling signal is inputted into a timing controller of the display device. The enabling signal includes a VBlank period. Specifically, the timing controller receives image data input from an external source, and parses out a first data enabling signal according to the image data. The first data enabling signal shows a plurality of frame periods of the display panel. In a current frame period of the display panel. The gamma voltage correction device takes an end time of the display phase in the current frame period as a start time and obtains a time difference between the current time and the start time in real time. The time difference is used as a duration of the VBlank phase in the current frame period in real time.

In the embodiment of the present disclosure, the enabling signal is a data enabling signal, which includes a number of vertical active display lines and a VBlank period of each image frame. The number of the vertical active display lines denotes a number of pixel rows in an effective display area in one image frame, and the VBlank period denotes total charging time of all pixel rows.

Furthermore, the number of the vertical active display lines includes the number of horizontal active display pixels per pixel row and a horizontal blanking (HBlank) period. The number of horizontal effective display pixels denotes the number of pixels in each pixel row, and the HBlank period denotes a charging time of a corresponding pixel row.

A product of a sum of the number of the vertical active display lines and the VBlank period and a sum of a number of active horizontal display pixels and (HBlank) period is a constant and is only related to a frame rate and a pixel clock frequency of images. The number of the active vertical display lines and the number of the active horizontal display pixels are related to resolution. Therefore, the VBlank period and the HBlank period are relatively changed. When the VBlank period is increased, the HBlank period is relatively decreased, and vice versa.

Furthermore, a value of the VBlank period and a value of the HBlank period can be represented by a number of clocks, and the number of clocks can be the number of pixel clocks.

Then, a refresh mode of the target display device is obtained. Specifically, in the current frame period of the display panel, the gamma voltage correction device obtains a first duration of the VBlank phase in the current display frame period and a second duration of the VBlank phase in the next display frame period in real time.

When the second duration is equal to the first duration, the VBlank period is set to be a constant VBlank period. Meanwhile, the refresh mode of the target display device has a constant display frequency. If the second duration is different from the first duration, the VBlank period is set to be a variable VBlank period. Meanwhile, the refresh mode of the target display device has a variable display frequency.

When the refresh mode of the target display device is the constant display frequency mode, the constant display frequency is set to the target display frequency of the target display device, and the backlight brightness value corresponding to the constant display frequency is set to be the target backlight brightness value of the target display device.

When the refresh mode of the target display device is the variable display frequency mode, a proportion of usage time of different display frequencies of the target display device within a historical period is obtained. The historical period is total time required by the display panel to switch into different display frequencies in a specific scene mode.

Specifically, the second display frequency of the target display device is obtained. A proportion of usage time of the second display frequency is greater than or equal to a first threshold value. Meanwhile, the second display frequency is set to be the target display frequency of the target display device. A backlight brightness value corresponding to the second display frequency is set to be the target backlight brightness value of the target display device. Meanwhile, the second display frequency is the most frequently used frequency of the display panel.

Furthermore, a third display frequency of the target display device is obtained. A proportion of usage time of the third display frequency is less than the first threshold. Meanwhile, because the third display frequency is not the most frequently frequency of the display panel. It is not advisable to set the third display frequency to be the target display frequency of the target display device.

Furthermore, a fourth display frequency of the target display device is obtained, A proportion of usage time of the fourth display frequency is greater than or equal to the first threshold. The fourth display frequency is set to be the target display frequency of the target display device. A backlight brightness value corresponding to the fourth display frequency is set to be the target backlight brightness value of the target display device. Meanwhile, because the fourth display frequency is the most frequently used frequency of the display panel. Therefore, the fourth display frequency most frequently, which is the most frequently used frequency used by users, is set to be the target display frequency of the target display device. Furthermore, since 60 Hz, 75 Hz, 120 Hz, 144 Hz, and 165 Hz are common refresh rates of liquid crystal display panels, the target display frequency can be any of 60 Hz, 7 Hz, 120 Hz, 144 Hz, or 165 Hz.

S20: obtaining a first display frequency and a first backlight brightness value of the target display device within a predetermined period.

Specifically, the step S20 further includes following steps: obtaining the first display frequency and the first backlight brightness value of the target display device within the predetermined period. The predetermined period is a period of at least one image frame. Specifically, after the target display frequency and the target backlight brightness value of the target display device in a current image frame are obtained, the first display frequency and the first backlight brightness value of the target display device are obtained after the predetermined period.

In the embodiment of the present disclosure, the predetermined period is a corresponding period from when a user uses the target display device in an initial application scene to when the user uses the target display device in a target application scene. In the initial application scene, a display frequency of the target display device is the target display frequency, and a backlight brightness value of the target display device is the target backlight brightness value.

Furthermore, the predetermined period includes at least one display frame duration. S30: confirming a backlight brightness compensation value of the target display device within the predetermined period according to a differential between the target display frequency and the first display frequency when the first display frequency and the target display frequency are different.

Specifically, the step S30 further includes following steps:

First, when the first display frequency and the target display frequency are same, it is not necessary to compensate for a backlight brightness of the first display frequency. When the first display frequency and the target display frequency are different, the backlight brightness of the first display frequency needs to be compensated.

In addition, when the first display frequency and the target display frequency are different, the backlight brightness compensation of the target display device in a preset period is determined according to the difference between the target display frequency and the first display frequency value.

Specifically, when the first display frequency and the target display frequency are different, a backlight brightness compensation value of the target display device within the predetermined period is obtained according to a differential between the target display frequency and the first display frequency.

In a method step of the embodiment of the present disclosure, the differential is greater than 0. That is, the target display frequency is greater than the first display frequency. Meanwhile, the step of confirming the backlight brightness compensation value of the target display device within the predetermined period includes:

First, obtaining a first refresh duration of a display frame image of a backlight unit of the display device corresponding to a target display frequency phase, and obtaining a second refresh duration of the display frame image of the backlight unit of the display device corresponding to the first display frequency phase, wherein the second refresh duration is different from the first refresh duration.

Then, obtaining a third refresh duration of the backlight unit, wherein the third refresh duration is a differential between the second refresh duration and the first refresh duration.

Specifically, the first refresh duration is a duration required for a corresponding backlight unit refreshing n1 times in one image frame period when the display device is at the target display frequency, wherein n1 is a positive integer. The second refresh duration is a duration required for a corresponding backlight unit refreshing n2 times in one image frame period when the display device is at the first display frequency, wherein n2 is a positive integer greater than n1. The third refresh duration is a duration required for a corresponding backlight unit refreshing (n2−n1) times in one image frame period when the display device is at the first display frequency.

Finally, confirming the backlight brightness compensation value of the target display device within the predetermined period during the third refresh duration of the backlight unit.

Specifically, the step of confirming the backlight brightness compensation value of the target display device within the predetermined period during the third refresh duration corresponding to the backlight unit comprises following steps:

First. confirming a refresh duration t and refresh times N of the backlight unit of a backlight driver chip during the third refresh duration within the predetermined period and when the display frequency of the display device is the first display frequency, wherein t is greater than 0 and N is a positive integer.

Specifically, the refresh duration t required for the driver chip of the driving backlight unit to refresh once within the third refresh duration is a duration required for the driving backlight unit to refresh once driven by the driver chip in the first display frequency. The backlight unit is refreshed N (n2−n1) times by the driver chip within the third refresh duration.

After that, when the backlight unit is refreshed at an $n^{th}$ time within the third refresh duration, the backlight driver chip starts to compensate for a brightness of the backlight unit, thereby confirming the backlight brightness value of the target display device within the predetermined period, wherein n is less than or equal to N and is a positive integer.

Specifically, when the backlight unit is refreshed at the $n^{th}$ time within the third refresh duration, the backlight driver chip takes a moment when the backlight unit starts to refresh at the $n^{th}$ time within the third refresh duration as a start time, and takes a moment when the backlight unit stars to refresh at the $N^{th}$ time within the third refresh duration as an ending time. The predetermined period is an interval between the ending time and the start time. During the predetermined period, the backlight driver chip starts to compensate for a brightness value of the backlight unit when the backlight unit is at least refreshed one time. The backlight driver chip may also compensate for a brightness value of the backlight unit every time when the backlight unit is refreshed.

Furthermore, during the predetermined period, the backlight driver chip has a same sum of the backlight brightness compensation values compensated for the backlight unit. Preferably, the backlight driving chip provides a same brightness compensation value for the backlight unit during every refresh time t.

In another method step of the embodiment of the present disclosure, the differential 0 is less than 0. That is, the target display frequency is less than the first display frequency. Meanwhile, the step of confirming the backlight brightness compensation value of the target display device within the predetermined period includes:

First, obtaining a first refresh duration of a display frame image of a backlight unit of the display device corresponding to a target display frequency phase, and obtaining a second refresh duration of the display frame image of the backlight unit of the display device corresponding to the first display frequency phase, wherein the second refresh duration is less than the first refresh duration.

Then, during the second refresh duration corresponding to the backlight unit, confirming the backlight brightness value of the target display device within the predetermined period. This step is same as the step of "confirming the backlight brightness compensation value of the target display device within the predetermined period during the third refresh duration of the backlight unit", and therefore is not described here again.

S40: compensating for the first backlight brightness value according to the backlight brightness compensation value.

Specifically, the S40 further includes following steps:

When the target display frequency is greater than the first display frequency, the backlight brightness compensation value is positive, and the backlight driver chip drives the backlight unit to increase the first backlight brightness value. The compensated first backlight brightness value is equal to the target brightness value.

When the target display frequency is less than the first display frequency, the backlight brightness compensation value is negative, and the backlight driver chip drives the backlight unit to reduce the first backlight brightness value. Therefore, the compensated first backlight brightness value is equal to the target brightness value.

Figure 2:
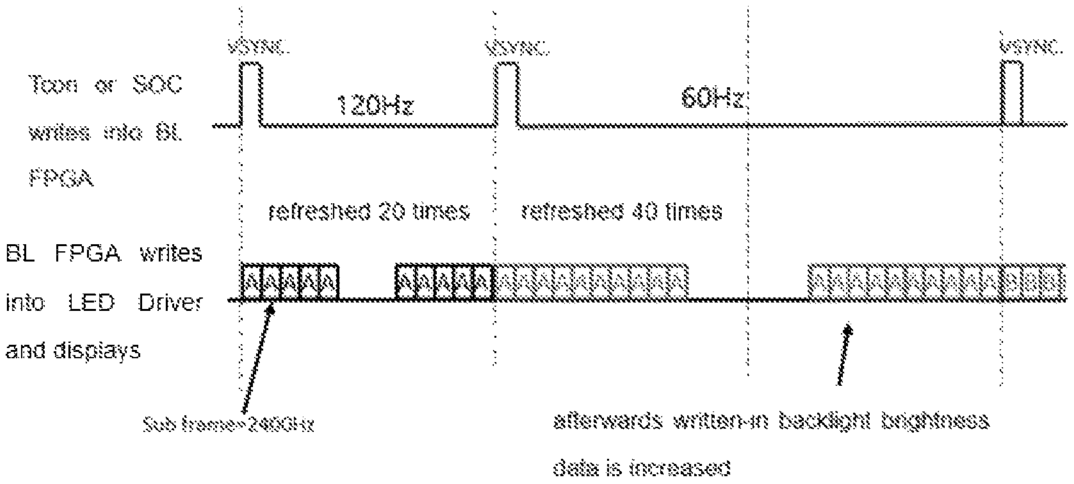
FIG. 2 is a schematic view showing a brightness compensation method of the display method of the display device provided by the embodiment of the present disclosure.

As shown in FIG. 2, a schematic view showing a brightness compensation method of the display method of the display device provided by the present embodiment is provided. The target display frequency is set to 120 Hz, the first display frequency is set to 60 Hz, and the constant refresh frequency of the backlight unit is set to 2400 Hz.

When a timer control register (TCON) or a system-on-a-chip (SOC) of the display device writes a vertical synchronization (VSync) signal into a field programmable gate array (FPGA), a display frequency of the VSync signal in a current image frame is 120 Hz, and a display frequency in a next image frame is 60 Hz.

Also, after a backlight control signal outputted by the FPGA of the backlight module is written into the backlight driver chip, the backlight driver chip adjusts light emission of the backlight unit. The backlight unit is refreshed times in an image with a display frequency of 120 Hz, and is refreshed 40 times in an image with a display frequency of 60 Hz.

Specifically, the backlight driver chip may count its own refresh times. Each refresh count is after an STV signal (image frame start signal) appears. When a display frequency is 120 Hz, a duration of one image frame of the display panel is the shortest, and refresh times of the backlight unit is the least.

Ideally, a backlight unit having a display frequency of 60 Hz during the first 20 refresh durations and a backlight unit having a display frequency of during the first 20 refresh durations have a same backlight brightness.

Therefore, an issue of reduced brightness due to the leakage currents of the display panel when the display device is switched from a high display frequency to a low display frequency can be effectively solved as long as a backlight brightness of the backlight unit having a display frequency of 60 Hz during the last 20 times refresh durations is increased.

An embodiment of the present disclosure provides a display method of a display device. The display method includes following steps: First, obtaining a target display frequency and a target backlight brightness value of a target display device. Then, obtaining a first display frequency and a first backlight brightness value of the target display device within a predetermined period. After that, confirming a backlight brightness compensation value of the target display device within the predetermined period according to a differential between the target display frequency and the first display frequency when the first display frequency and the target display frequency are different. Finally, compensating for the first backlight brightness value according to the backlight brightness compensation value. In the above display method, first, the backlight brightness compensation value of the target display device within the predetermined period is confirmed according to the differential between the target display frequency and the first display frequency. Then, the first backlight brightness value is compensated according to the backlight brightness compensation value. Therefore, changes in brightness of the display device caused by changes in frequency in a variable refresh frequency mode are adjusted by controlling a brightness of a backlight source of the display device. As such, a flickering phenomenon of the display device caused by changes in frequency in the variable refresh frequency mode can be effectively alleviated, and a display effect of the display device can be further improved.

Figure 3:
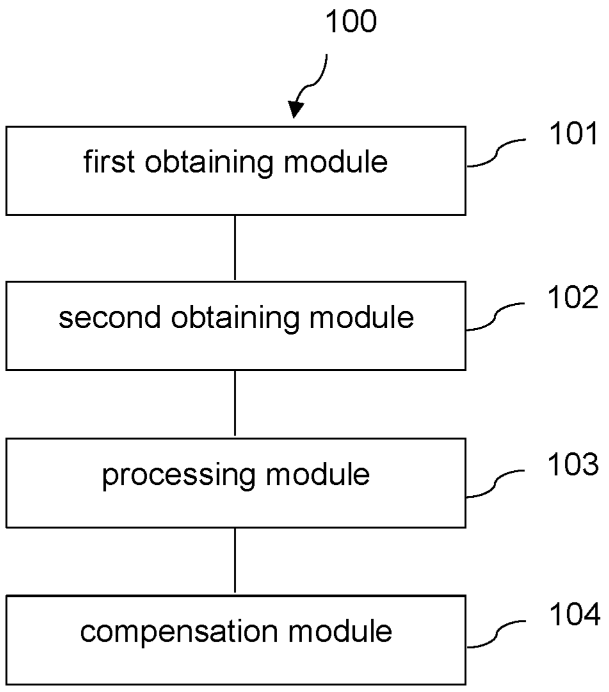
FIG. 3 is a structural view showing a display device provided by an embodiment of the present disclosure.

Correspondingly, as shown in FIG. 3, a structural view showing a display device provided by an embodiment of the present disclosure is provided. An embodiment of the present disclosure provides a display device 100, including:

- a first obtaining module 101 configured to obtain a target display frequency and a target backlight brightness value of the target display device;
- a second obtaining module 102 configured to obtain a first display frequency and a first backlight brightness value of the target display device within a predetermined period;
- a processing module 103 configured to confirm a backlight brightness compensation value of the target display device within a predetermined period according to a differential between the target display frequency and the first display frequency when the first display frequency and the target display frequency are different; and
- a compensation module 104 configured to compensate for the first backlight brightness value according to the backlight brightness compensation value.

In one embodiment, the first obtaining module 101 is further configured to input an enabling signal to a timing controller of the display device. The enabling signal includes a VBlank period.

A refresh mode of the target display device is obtained.

When the refresh mode of the target display device has a constant display frequency, the VBlank period is set to be a constant Vblank period. When the refresh mode of the target display device has a variable display frequency, the Vblank period is set to be a variable VBlank period.

In one embodiment, the first obtaining module 101 is further configured to obtain a proportion of usage time of different display frequencies of the target display device within a historical period.

When a proportion of usage time of the second display frequency in different display frequencies is greater than or equal to a first threshold, the second display frequency is set to be the target display frequency of the target display device. A backlight brightness value corresponding to the second display frequency is set to be the target brightness value of the target display device.

In one embodiment, the first obtaining module 101 is further configured to obtain a third display frequency of a target display device when the proportion of usage time of the second display frequency in different display frequencies is less than the first threshold. A proportion of usage time of the third display frequency is greater than or equal to the first threshold.

The third display frequency is set to be the target display frequency of the target display device, A backlight brightness value corresponding to the third display frequency is set to be the target backlight brightness value of the target display device.

In one embodiment, the processing module 103 is further configured to obtain a differential between the target display frequency and the first display frequency when the first display frequency and the target display frequency are different.

When the differential is greater than 0, a first refresh duration of an image frame when the backlight unit of the display device corresponds to a target display frequency phase is obtained, and a second refresh duration of an image frame when the backlight unit of the display device corresponds to a first display frequency phase is obtained.

A third refresh duration of the backlight unit is obtained, wherein the third refresh duration is a differential between the second refresh duration and the first refresh duration.

The backlight brightness compensation value of the target display device within the predetermined period during the third refresh duration is confirmed.

Furthermore, when the target display frequency is greater than the first display frequency, the processing module is further configured to confirm, within the predetermined period, a refresh duration t and refresh times N of the backlight unit of a backlight driver chip of the display device during the third refresh duration, wherein t is greater than 0 and N is a positive integer.

When the backlight unit is refreshed at an $n^{th}$ time within the third refresh duration, the backlight driver chip starts to compensate for a brightness of the backlight unit to confirm the backlight brightness compensation value of the target display device within the predetermined period, wherein n is less than or equal to N and is a positive integer.

Furthermore, the backlight driver chip has the same brightness compensation value for the backlight unit within each refresh duration t.

In another embodiment, the processing module 103 is further configured to obtain a first refresh duration of an image frame when the backlight unit of the display device corresponds to the target display frequency phase and the second refresh duration of an image frame corresponding to the first display frequency phase when the differential is less than 0.

Confirming the backlight brightness compensation value of the target display device within the predetermined period during the second refresh duration of the backlight unit.

In one embodiment, the compensated first backlight brightness value of the compensation module 104 is equal to the target backlight brightness value.

Embodiments of the present disclosure provide a display device and a display method thereof. The display method includes following steps: First, obtaining a target display frequency and a target backlight brightness value of a target display device. Then, obtaining a first display frequency and a first backlight brightness value of the target display device within a predetermined period. After that, confirming a backlight brightness compensation value of the target display device within the predetermined period according to a differential between the target display frequency and the first display frequency when the first display frequency and the target display frequency are different. Finally, compensating for the first backlight brightness value according to the backlight brightness compensation value. In the above display method, first, the backlight brightness compensation value of the target display device within the predetermined period is confirmed according to the differential between the target display frequency and the first display frequency. Then, the first backlight brightness value is compensated according to the backlight brightness compensation value. Therefore, changes in brightness of the display device caused by changes in frequency in a variable refresh frequency mode are adjusted by controlling a brightness of a backlight source of the display device. As such, a flickering phenomenon of the display device caused by changes in frequency in the variable refresh frequency mode can be effectively alleviated, and a display effect of the display device can be further improved.

The display device and the display method thereof provided by the above embodiments of the present disclosure have been described in detail, which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A display method of a display device, comprising following steps:
- obtaining a target display frequency and a target backlight brightness value of a target display device;
- obtaining a first display frequency and a first backlight brightness value of the target display device within a predetermined period;
- confirming a backlight brightness compensation value of the target display device within the predetermined period according to a differential between the target display frequency and the first display frequency when the first display frequency and the target display frequency are different; and
- compensating for the first backlight brightness value according to the backlight brightness compensation value;
- wherein before the step of obtaining the target display frequency and the target backlight brightness value of the target display device, the method comprises following steps:
- inputting an enabling signal into a timing controller of the target display device, wherein the enabling signal comprises a vertical blanking (VBlank) period; and
- obtaining a refresh mode of the target display device;
- wherein when the refresh mode of the target display device has a constant display frequency, the VBlank period is a constant VBlank period;
- when the refresh mode of the target display device has a variable display frequency, the VBlank period is a variable VBlank period; and
- wherein the step of obtaining the target display frequency and the target backlight brightness value of the target display device comprises following steps:
- obtaining a proportion of usage time of different display frequencies of the target display device within a historical period;
- obtaining a second display frequency of the target display device, wherein a proportion of usage time of the second display frequency is greater than or equal to a first threshold value; and
- setting the second display frequency to be the target display frequency of the target display device, and setting a backlight brightness value corresponding to the second display frequency to be the target backlight brightness value of the target display device.

2. The display method of the display device of claim 1, wherein the step of obtaining the target display frequency and the target backlight brightness value of the target display device comprises following steps:
- obtaining a proportion of usage time of different display frequencies of the target display device within a historical period;
- obtaining a third display frequency of the target display device, wherein a proportion of usage time of the third display frequency is less than a first threshold value;
- obtaining a fourth display frequency of the target display device, wherein a proportion of usage time of the fourth display frequency is greater than or equal to the threshold value; and
- setting the fourth display frequency to be the target display frequency of the target display device, setting a backlight brightness value corresponding to the fourth display frequency to be the target backlight brightness value of the target display device.

3. The display method of the display device of claim 1, wherein the step of confirming the backlight brightness compensation value of the target display device within the predetermined period according to the differential between the target display frequency and the first display frequency when the first display frequency and the target display frequency are different comprises following steps:
- obtaining the differential between the target display frequency and the first display frequency when the first display frequency and the target display frequency are different;
- obtaining a first refresh duration of a display frame image of a backlight unit of the display device corresponding to a target display frequency phase, and obtaining a second refresh duration of the display frame image of the backlight unit of the display device corresponding to the first display frequency phase;
- obtaining a third refresh duration of the backlight unit when the differential is greater than 0, wherein the third refresh duration is equal to a differential between the second refresh duration and the first refresh duration; and
- confirming the backlight brightness compensation value of the target display device within the predetermined period during the third refresh duration of the backlight unit.

4. The display method of the display device of claim 3, wherein when the target display frequency is greater than the first display frequency, the step of confirming the backlight brightness compensation value of the target display device within the predetermined period during the third refresh duration corresponding to the backlight unit comprises following steps:

confirming a refresh duration t and refresh times N of the backlight unit of a backlight driver chip of the display device during the third refresh duration, wherein t is greater than 0 and N is a positive integer; and compensating for a brightness of the backlight unit by the backlight driver chip to confirm the backlight brightness compensation value of the target display device within the predetermined period during an $n^{th}$ refresh time in the third refresh duration of the backlight unit, wherein n is less than or equal to N and is a positive integer.

5. The display method of the display device of claim 4, wherein in the step of compensating for a brightness of the backlight unit by the backlight driver chip during the $n^{th}$ refresh time in the third refresh duration of the backlight unit, a plurality of compensation values provided by the backlight driver chip for compensating for a brightness of the backlight unit in every refresh time t are same.

6. The display method of the display device of claim 3, wherein the step of confirming the backlight brightness compensation value of the target display device within the predetermined period according to the differential between the target display frequency and the first display frequency when the first display frequency and the target display frequency are different comprises a following step:

confirming the backlight brightness compensation value of the target display device within the predetermined period during the second refresh duration of the backlight unit when the differential is less than 0.

7. The display method of the display device of claim 1, wherein in the step of compensating for the first backlight brightness value according to the backlight brightness compensation value, after the first backlight brightness value is compensated, the first backlight brightness value is equal to the target backlight brightness value.

8. A display method of the display device, comprising following steps:

obtaining a target display frequency and a target backlight brightness value of a target display device;

obtaining a first display frequency and a first backlight brightness value of the target display device within a predetermined period;

confirming a backlight brightness compensation value of the target display device within the predetermined period according to a differential between the target display frequency and the first display frequency when the first display frequency and the target display frequency are different; and compensating for the first backlight brightness value according to the backlight brightness compensation value;

wherein the step of obtaining the target display frequency and the target backlight brightness value of the target display device comprises following steps:

obtaining a proportion of usage time of different display frequencies of the target display device within a historical period;

obtaining a second display frequency of the target display device, wherein a proportion of usage time of the second display frequency is greater than or equal to a first threshold value; and setting the second display frequency to be the target display frequency of the target display device, and setting a backlight brightness value corresponding to the second display frequency to be the target backlight brightness value of the target display device.

9. The display method of the display device of claim 8, wherein the step of obtaining the target display frequency and the target backlight brightness value of the target display device comprises following steps:

obtaining a proportion of usage time of different display frequencies of the target display device within a historical period;

obtaining a third display frequency of the target display device, wherein a proportion of usage time of the third display frequency is less than a first threshold value;

obtaining a fourth display frequency of the target display device, wherein a proportion of usage time of the fourth display frequency is greater than or equal to the threshold value; and setting the fourth display frequency to be the target display frequency of the target display device, setting a backlight brightness value corresponding to the fourth display frequency to be the target backlight brightness value of the target display device.

10. The display method of the display device of claim 8, wherein the step of confirming the backlight brightness compensation value of the target display device within the predetermined period according to the differential between the target display frequency and the first display frequency when the first display frequency and the target display frequency are different comprises following steps:

obtaining the differential between the target display frequency and the first display frequency when the first display frequency and the target display frequency are different;

obtaining a first refresh duration of a display frame image of a backlight unit of the display device corresponding to a step of the target display frequency, and obtaining a second refresh duration of the display frame image of the backlight unit of the display device corresponding to a step of the first display frequency;

obtaining a third refresh duration of the backlight unit when the differential is greater than 0, wherein the third refresh duration is equal to a differential between the second refresh duration and the first refresh duration; and confirming the backlight brightness compensation value of the target display device within the predetermined period during the third refresh duration of the backlight unit.

11. The display method of the display device of claim 10, wherein when the target display frequency is greater than the first display frequency, the step of confirming the backlight brightness compensation value of the target display device within the predetermined period during the third refresh duration corresponding to the backlight unit comprises following steps:

confirming a refresh duration t and refresh times N of the backlight unit of a backlight driver chip of the display device during the third refresh duration, wherein t is greater than 0 and N is a positive integer; and compensating for a brightness of the backlight unit by the backlight driver chip to confirm the backlight brightness compensation value of the target display device within the predetermined period during an $n^{th}$ refresh time in the third refresh duration of the backlight unit, wherein n is less than or equal to N and is a positive integer.

12. The display method of the display device of claim 11, wherein in the step of compensating for a brightness of the backlight unit by the backlight driver chip during the $n^{th}$ refresh time in the third refresh duration of the backlight unit, a plurality of compensation values provided by the backlight driver chip for compensating for a brightness of the backlight unit in every refresh time t are same.

13. The display method of the display device of claim 10, wherein the step of confirming the backlight brightness compensation value of the target display device within the predetermined period according to the differential between the target display frequency and the first display frequency when the first display frequency and the target display frequency are different comprises a following step:

confirming the backlight brightness compensation value of the target display device within the predetermined period during the second refresh duration of the backlight unit when the differential is less than 0.

14. The display method of the display device of claim 8, wherein in the step of compensating for the first backlight brightness value according to the backlight brightness compensation value, after the first backlight brightness value is compensated, the first backlight brightness value is equal to the target backlight brightness value.

15. A display device, comprising:

a first obtaining module, wherein the first obtaining module is configured to obtain a target display frequency and a target backlight brightness value of a target display device;

a second obtaining module, wherein the second obtaining module is configured to obtain a first display frequency and a first backlight brightness value of the target display device;

a processing module, wherein the processing module is configured to confirm a backlight brightness compensation value of the target display device within a predetermined period according to a differential between the target display frequency and the first display frequency when the first display frequency and the target display frequency are different; and a compensation module, wherein the compensation module is configured to compensate for the first backlight brightness value according to the backlight brightness compensation value;

wherein the processing module is configured to obtain a differential between the target display frequency and the first display frequency when the first display frequency and the target display frequency are different, and the processing module is configured to obtain a first refresh duration of a display frame image of a backlight unit of the display device corresponding to a target display frequency phase, and is configured to obtain a second refresh duration of the display frame image of the backlight unit of the display device corresponding to the first display frequency phase; and wherein when the differential is greater than 0, the processing module is configured to obtain a third refresh duration of the backlight unit, and the third refresh duration is a differential between the second refresh duration and the first refresh duration.

16. The display device of claim 15, wherein the first obtaining module is configured to obtain a refresh mode of the target display device; and wherein when the refresh mode of the target display device has a constant display frequency, a vertical blanking (VBlank) period is a constant v VBlank period; and when the refresh mode of the target display device has a variable display frequency, the VBlank period is a variable VBlank period.

17. The display device of claim 15, wherein the compensation module is configured to adjust the compensated first backlight brightness value to the target backlight brightness value.

* * * * *